(12) United States Patent
Steinbacher

(10) Patent No.: US 11,491,886 B2
(45) Date of Patent: Nov. 8, 2022

(54) DC VOLTAGE CHARGING POST FOR CHARGING AN ELECTRIC VEHICLE

(71) Applicant: ELOADED GMBH, Innsbruck (AT)

(72) Inventor: Frank Steinbacher, Innsbruck (AT)

(73) Assignee: ELOADED GMBH, Innsbruck (AT)

( * ) Notice: Subject to any disclaimer, the term of this patent is extended or adjusted under 35 U.S.C. 154(b) by 0 days.

(21) Appl. No.: 17/254,554

(22) PCT Filed: Jun. 21, 2019

(86) PCT No.: PCT/EP2019/025191
§ 371 (c)(1),
(2) Date: Dec. 21, 2020

(87) PCT Pub. No.: WO2019/242891
PCT Pub. Date: Dec. 26, 2019

(65) Prior Publication Data
US 2021/0268925 A1    Sep. 2, 2021

(30) Foreign Application Priority Data

Jun. 22, 2018 (EP) ..................... 18020275

(51) Int. Cl.
*B60L 53/30* (2019.01)
*B60L 53/68* (2019.01)
*B60L 53/31* (2019.01)
*B60L 53/65* (2019.01)
(Continued)

(52) U.S. Cl.
CPC ............... *B60L 53/305* (2019.02); *B60L 3/04* (2013.01); *B60L 53/31* (2019.02); *B60L 53/65* (2019.02); *B60L 53/68* (2019.02); *H02J 7/00032* (2020.01); *H02J 7/0042* (2013.01); *B60L 2210/10* (2013.01); *H02J 2207/20* (2020.01)

(58) Field of Classification Search
CPC ........ B60L 53/305; B60L 53/68; H02J 7/0042
USPC ........................................... 320/109
See application file for complete search history.

(56) References Cited

U.S. PATENT DOCUMENTS 11,270,243 B1 * 3/2022 Roy ..................... B60L 53/67
11,338,695 B2 * 5/2022 Raaijmakers ......... H02J 7/0013
(Continued)

FOREIGN PATENT DOCUMENTS

DE    102011079430    1/2013
DE    102014115019    4/2016
(Continued)

*Primary Examiner* — Suchin Parihar
(74) *Attorney, Agent, or Firm* — Duane Morris LLP; Gregory M. Lefkowitz; Randall C. Pyles

(57) ABSTRACT

The invention describes a DC voltage charging post (100; 200; 300) for charging an electric vehicle. The DC voltage charging post (100; 200; 300) comprises two DC voltage charging post input connections (102, 104) for an input DC voltage (VE) with a first voltage range provided by a central unit; a first DC voltage converter (106; 302) for converting the input DC voltage (VE) into a output DC voltage (VA) with a second voltage range; two DC voltage charging post output connections (108, 110) for providing the output DC voltage (VA) to the electric vehicle; and a control unit (112) with a first communication interface (114) for communication between the DC voltage charging post (100; 200; 300) and the central unit.

12 Claims, 3 Drawing Sheets

(51) Int. Cl.
*H02J 7/00* (2006.01)
*B60L 3/04* (2006.01)

(56) References Cited

U.S. PATENT DOCUMENTS

| | | | |
|---|---|---|---|
| 2013/0069592 A1* | 3/2013 | Bouman | H02J 7/007 |
| | | | 320/109 |
| 2013/0076294 A1* | 3/2013 | Smith | H02J 7/35 |
| | | | 320/109 |
| 2014/0084843 A1 | 3/2014 | Pham | |
| 2015/0288201 A1 | 10/2015 | Hatakeyama et al. | |
| 2016/0375781 A1 | 12/2016 | Herke et al. | |
| 2017/0158079 A1* | 6/2017 | Lim | G01R 31/44 |
| 2018/0162229 A1* | 6/2018 | Gotz | B60L 3/00 |
| 2018/0345800 A1 | 12/2018 | Beer | |
| 2020/0139839 A1* | 5/2020 | Raaijmakers | H02J 7/0042 |

FOREIGN PATENT DOCUMENTS

| | | |
|---|---|---|
| EP | 2875985 | 5/2015 |
| EP | 3321120 | 5/2018 |
| WO | 03/047904 | 6/2003 |

* cited by examiner

DC VOLTAGE CHARGING POST FOR CHARGING AN ELECTRIC VEHICLE

CROSS-REFERENCE TO RELATED APPLICATIONS

This application is a § 371 national stage entry of International Application No. PCT/EP2019/025191, filed Jun. 21, 2019, which claims priority to European Patent Application No. 18020275.6, filed Jun. 22, 2018, the entire contents of which are incorporated herein by reference.

TECHNICAL FIELD

The present invention relates to a DC voltage charging post for charging an electric vehicle.

PRIOR ART

For charging electric vehicles with electricity, in general charging devices are used. In the home sector, these are called "wallboxes", since they are usually fastened to a house wall. In the public sphere, so-called charging posts are frequently set up. Wall boxes and charging posts usually have one or several plug sockets. The plug sockets are also described as charging points. A charging cable with plug can be connected to the plug socket or is already mounted and connects the electric vehicle electrically with the charging device.

Different plug-in connection types are known, such as e.g.:
  Schuko plugs
  IEC 62196-2 type 1, a single-phase AC current connection;
  IEC 62196-2 type 2, a single- and three-phase AC current connection and
  IEC 62196-2 type 3, a single- and three-phase AC current connection with protective mechanisms.

Type-2 plug-in connections are mostly used in Europe and permit also the charging with DC current with power outputs of up to 120 kW (Type-2 Tesla—DC charging via Type-2 plug).

When charging with AC current, usually a converter is provided in the electric vehicles, which converts the AC current into the DC current necessary for the charging of the battery. For rapid charging with high power, however, a disadvantageously large and expensive converter would be necessary in each electric vehicle. For this reason, for rapid charging, the industry is increasingly focusing on DC voltage or DC current charging posts, also known as DC posts, DC charging posts or DC rapid chargers.

The following rapid charger plug-in connections have established themselves hitherto:
  CCS, combined charging system, is a standard which was developed by German car manufacturers and which is mandatory EU-wide since 2014, which describes the charging with AC current and DC current. Here, a plug on the electric vehicle side for charging with AC current is equipped with a type-2 plug and for charging with DC current is equipped with two additional high-power DC current charging pins.
  Chademo is a standard which was developed inter alia by Japanese car manufacturers.
  Tesla supercharger is a proprietary technology belonging to Tesla for the charging of Tesla electric vehicles.

From the German patent application DE102015110023 is furthermore known a charging station or central unit for charging a plug-in motor vehicle at a charging post, wherein this charging station comprises a power transformer, several rectifier modules and a regenerative-capable buffer storage.

OBJECT OF THE INVENTION

Thus, the object of the invention consists in improving the interaction of a DC voltage charging post with a central unit.

DISCLOSURE OF THE INVENTION

According to the invention, a DC voltage charging post according to claim 1 is provided for charging an electric vehicle.

The DC voltage charging post according to the invention comprises preferably two DC voltage charging post input connections for an input DC voltage with a first voltage range, wherein the input DC voltage is provided by a central unit. Furthermore, the DC voltage charging post according to the invention includes a first DC voltage converter for converting the input DC voltage into an output DC voltage with a second voltage range, as well as two DC voltage charging post output connections for providing the output DC voltage to the electric vehicle. The DC voltage charging post according to the invention can furthermore comprise a control unit having a first communication interface for communication between the DC voltage charging post and the central unit.

DC voltage charging posts are for example also described as DC current charging posts, DC posts, DC charging posts or DC rapid chargers.

The term "electric vehicle" should preferably include the following meanings:
  pure electric vehicles, driven solely with battery current, the English description being Battery Electric Vehicle,
  vehicles with electric drive and range extender;
  hybrid vehicles, the English term being Hybrid Electric Vehicle;
  plug-in hybrids, the English term being Plug-In Hybrid Electric Vehicle, and
  fuel cell vehicles.

Here, charging preferably describes supplying electric energy to an accumulator for charging. Accumulators can also be described as batteries. Their use in an electric vehicle is preferably paraphrased as a drive battery or traction battery.

It is generally desirable to be able to charge batteries rapidly. Particularly on long journeys which exceed the range of an electric vehicle battery, a rapid charging is advantageous. A battery can either be charged over a long time with low power or in a short time with high power; the charging energy is equal to power multiplied by charging time.

A DC voltage converter, also called DC-DC converter, describes generally an electrical circuit which converts a DC voltage supplied at the input into a DC voltage with higher, lower or inverted voltage level. DC voltage converters typically have two input connections and two output connections.

In a preferred embodiment, the control unit transmits or receives via the first communication interface at least one of the following items of information
  status of the DC voltage charging post and/or
  data regarding the maximum power outputted from the DC voltage charging post and/or
  charging energy value and/or
  charging time value and/or electric vehicle identification information and/or software update data.

The status of the DC voltage post here comprises e.g.:
information as to whether or not an electric vehicle is connected for charging and/or
information as to whether an electric vehicle is currently being charged and/or
information regarding the circuitry one or of several of the DC voltage converters,
the available energy, power, voltage, operational status and future operational statuses of the central unit (e.g. energy availability prognoses on the basis of the energy supply connections (photovoltaic current, biomass current production)).

The charging energy value includes preferably the product of charging time and charging power. The charging energy value and/or the charging time value can serve as a basis for calculating the sales price for the battery charging and/or as customer information.

On the basis of the electric vehicle identification information, the central unit or the DC voltage charging post can determine which maximum charging power is admissible for the respectively connected electric vehicle, and can output a corresponding maximum power and make this available to the DC voltage charging post.

A central unit can include and control one or several DC voltage charging posts.

The DC voltage charging post according to the invention can furthermore improve the energy efficiency.

According to a further preferred embodiment, the control unit can at the first communication interface support a serial communication standard, in particular ethernet.

Wired communication, such as ethernet, can be advantageous with respect to wireless communication between central unit and DC voltage charging post, in order e.g. to reduce the influence of high-frequency interference generated in the DC voltage charging post or in the environment. Ethernet cable, router and network cards are generally inexpensive and permit high data rates; frequently, PCs and industrial computers are already equipped with an ethernet interface as standard and can be used for the control unit or the central unit. For ethernet copper cables, advantageously link lengths of up to approximately 100 m are possible, with ethernet glass fibre cables, usually even more.

In a further advantageous further development of the invention, the control unit includes a second communication interface for communication between the DC voltage charging post and the electric vehicle.

Via the second communication interface, in particular the control unit and the battery management system of the electric vehicle can communicate with one another with reference to a communication protocol.

The battery management system can transmit e.g.
the current charging state of the electric vehicle battery and/or
the DC voltage and maximum charging current strength or maximum charging power and/or
momentary voltage of the battery and/or
battery temperature
to the control unit.

Via the first communication interface, the control unit can receive software update data, in order to update a communication protocol for the second communication interface. Thus, the DC voltage charging post can e.g. also continuously communicate with newest electric vehicles during the charging.

According to a further development, the control unit can support at least two different communication protocols at the second communication interface, e.g. Chademo and/or CCS and/or Tesla Supercharger. At one such DC voltage charging post, thus electric vehicles with different plug-in connections can be charged at one charging point.

A further preferred embodiment can consist in the DC voltage charging post being equipped with a second DC voltage converter which is connected selectively in parallel or in series to the first DC voltage converter.

A series connection of the DC voltage converter can achieve an addition of the output DC voltages of the DC voltage converter. A parallel connection of the DC voltage converter can achieve an increase in an output DC current of the DC voltage converter. An output DC current increase at the same output DC voltage has the effect of an increase in the output power of the DC voltage converter. Thus, the DC voltage charging post can provide different charging voltages and charging powers. For example, when charging a lithium ion battery, it is initially charged with maximum charging power and the charging power is reduced in the further course of the charging. The DC voltage charging post can include several charging points. Depending on the course, the control unit can switch DC voltage converters from one to another charging point. The DC voltage charging post can include a third, fourth and where appropriate further DC voltage converters. The series or parallel connection of all DC voltage converters achieves substantially the previously mentioned effects. The DC voltage charging post according to the invention can thus be designed in a modular fashion and is thus capable of being simply extended. This is advantageous for example for implementation in a present public or private constructional infrastructure.

According to a further preferred embodiment, the DC voltage charging post has a switch matrix which is connected to the control unit, to at least one input connection of each or at least several DC voltage converters and to the DC voltage charging post input connections. The control unit can control the switch matrix such that all DC voltage converters are connected either in parallel or in series.

Preferably, the DC voltage charging post includes an isolation measuring unit which is connected to the DC voltage charging post input connections and to earth or ground, wherein the isolation measuring unit measures the isolation of the DC voltage charging post to earth and depending on the measurement disconnects electrically the DC voltage charging post from the electric vehicle. The isolation measuring unit can serve to assess the functionality and safety of the DC voltage charging post and can furthermore identify deficiencies at an early stage.

The central unit can include a central DC voltage source, a transformer and/or a buffer storage or a direct feed from photovoltaic generation which generate the input DC voltage and makes available one or several DC voltage charging posts. The isolation measuring unit can advantageously be arranged in each single DC voltage charging post and determine only the local isolation in the respective DC voltage charging post and where appropriate disconnect it from the electric vehicle.

Furthermore, the DC voltage charging post according to any of the preceding claims can be equipped with a power measuring unit which is connected to the DC voltage charging post input connections and which determines the power outputted to the electric vehicle and/or the charging time. The charging energy value comprises preferably the product of charging time or charging time value and charging power. The charging energy value and/or the charging time value can serve as a basis for calculating a sales price for the battery charge and/or as customer information.

In addition, the DC voltage charging post can include a temperature measuring unit which is configured to control the power output of the DC voltage charging post as a function of the measured temperature. DC voltage charging posts should preferably be able to output full power in an environment temperature range of −20° C. to 45° C. According to Joule's first law, current-conducting components of the DC voltage charging post generate a certain thermal energy. If the temperature measuring unit determines an environment temperature or DC voltage charging post temperature which is above a predetermined threshold value, thus the temperature measuring unit can by means of the control unit reduce the power output of the DC voltage charging post and thus of the current-conducting components, in order for example to prevent the components from overheating, melting or catching fire.

According to a further development, the DC voltage charging post includes a main switch which is connected in series between the first DC voltage converter and one of the DC voltage charging post input connections, wherein the main switch is configured to connect the first DC voltage converter selectively with one of the DC voltage charging post input connections, or to disconnect it therefrom. In this regard, the at least one main switch can be controlled depending on an emergency stop signal, a system error signal or the isolation of the DC voltage charging post to earth. The DC voltage charging post can include an emergency switch which is operated by a DC voltage charging post user and which generates an emergency stop signal. The control unit and/or the central unit can generate the system error signal in the case of a malfunction. The isolation measuring unit can control the main switch depending on the measured isolation. Furthermore, one main switch can be provided for each DC voltage charging post input connection.

The term "connected" includes preferably the meaning "electrically connected", "connected so as to be electrically conducting" and "coupled".

SHORT DESCRIPTION OF THE DRAWINGS

Embodiments of the invention are explained with reference to the drawings and the following description.

EMBODIMENT OF THE INVENTION

Figure 1:
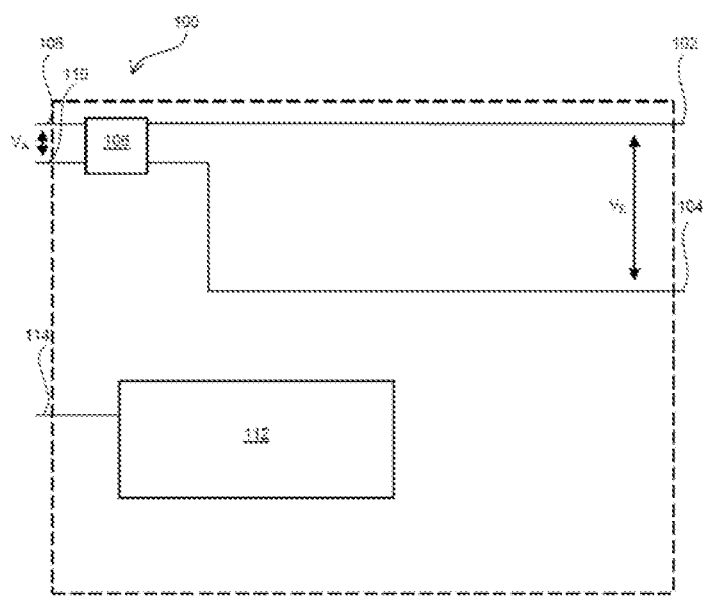
FIG. 1 shows a DC voltage charging post according to the invention.

FIG. 1 shows a DC voltage charging post 100 for charging a battery of an electric vehicle. The DC voltage charging post 100 includes two DC voltage charging post input connections 102, 104 for an input DC voltage $V_E$ with a first voltage range from 0 V to 200 V or from 0 V to 920 V, wherein ground potential 0 V is applied to the DC voltage charging post input connection 104. The input DC voltage is provided by a central unit and can be configured both +1000 V to earth or +−500 V to earth in the context of a DC bus supply.

Furthermore, FIG. 1 shows a DC voltage converter 106 which forms a first DC voltage converter, for converting the input DC voltage $V_E$ into an output DC voltage $V_A$ with a second voltage range of 1000 V. The DC voltage converter 106 has moreover two DC voltage charging post output connections 108, 110 for providing the output DC voltage $V_A$ to the electric vehicle, wherein to the DC voltage charging post output connection 180 is applied a potential of 500 V and to the DC voltage charging post output connection 110 is applied a potential of −500 V.

The DC voltage charging post 106 has furthermore a control unit 112 with an ethernet interface 114 for communication between the DC voltage charging post 106 and the central unit.

Figure 2:
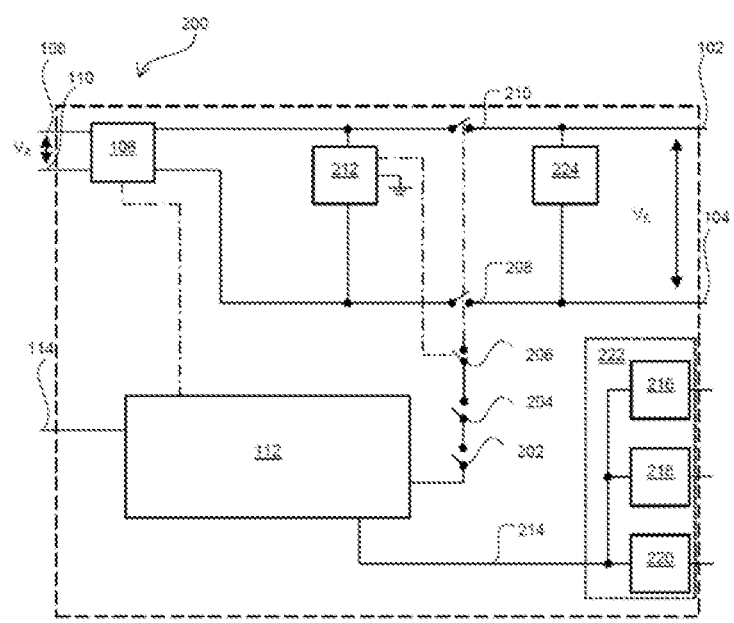
FIG. 2 shows a further DC voltage charging post according to the invention and FIG. 3 shows a further DC voltage charging post according to the invention.

FIG. 2 shows a DC voltage charging post 200 which includes the components 102 to 114 of the DC voltage charging post 100 as well as a system error switch 202, an emergency off-switch 204, and isolation switch 206 and two main switches 208, 210. The switches 202 to 206 are connected to the control unit 112. The main switches 208, 210 are connected in each case in series between the DC voltage charging post input connections 102, 100 and the DC voltage converter 106. If one of the switches 202 to 206 is actuated, they generate a signal which actuates the main switch 208, 210 such that the DC voltage converter 106 is disconnected or isolated electrically from the DC voltage charging post input connections 102, 104. The DC voltage charging post 200 includes an isolation measuring unit 212 which measures the isolation of the DC voltage charging post 200 to earth. If the measured isolation exceeds a predetermined threshold value, the isolation measuring unit 212 actuates the isolation switch 206 directly, i.e. without involving the control unit, wherein the isolation switch 206 in turn generates an isolation signal which actuates the main switches 208, 210 such that the DC voltage converter 106 is electrically disconnected or isolated from the DC voltage charging post input connections 102, 104.

The emergency off-switch 204 can in an emergency be actuated by a DC current charging post user. The emergency off-switch 204 generates an emergency off-signal which actuates the main switches 208, 210 such that the DC voltage converter 106 is electrically disconnected or isolated from the DC voltage charging post input connections 102, 104.

The system error switch 202 can be actuated by the control unit 112 and generate a system error signal which actuates the main switches 208, 210 such that the DC voltage converter 106 is electrically disconnected or isolated from the DC voltage charging post input connections 102, 104.

The control unit 112 from FIG. 2 includes furthermore an electric vehicle communication interface 214 which forms a second communication interface for communication of the DC voltage charging post 200 with the electric vehicle. The electric vehicle communication interface comprises three protocol interfaces for the CCS protocol 216, for the Chademo protocol 218 and for the Tesla-Supercharger protocol 220. The three protocol interfaces are implemented as a computer 222. The computer 222 and/or the control unit 112 comprise a mini PC or a board computer, such as Raspberry Pi, Arduino or similar.

The DC voltage charging post 200 includes furthermore a power measuring unit 224 which is connected to the DC voltage charging post input connections 102 and 104 and which determines the power outputted to the electric vehicle and/or the charging time. The charging energy value comprises the product of charging time or charging time value and charging power. The charging energy value and/or the charging time value serve as a basis for calculating a sales price for a battery charge and/or as customer information.

Figure 3:
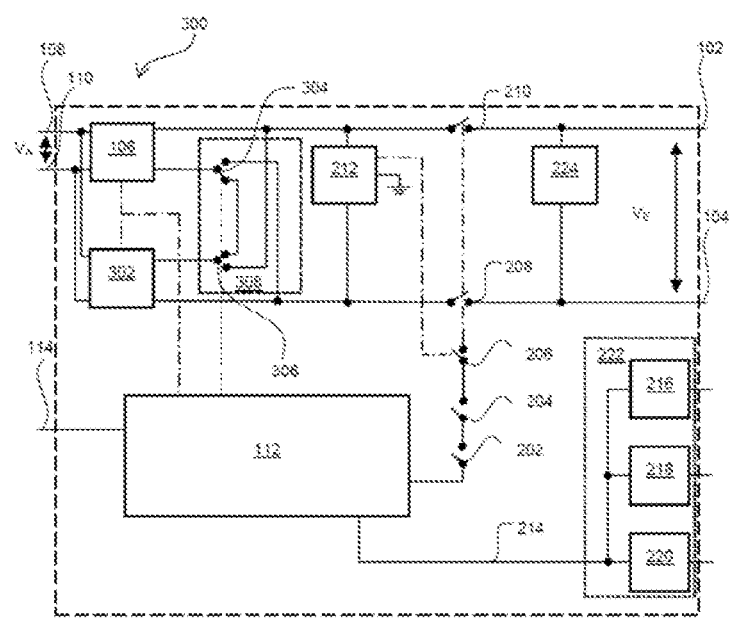

FIG. 3 shows a DC voltage charging post 300 which comprises the components 102 to 114 of the DC voltage charging post 100, the components 202 to 224 of the DC voltage charging post 200 as well as a second DC voltage converter 302. The second DC voltage converter 302 is operated selectively connected in parallel or in series to the DC voltage converter 106.

The DC voltage charging post 300 includes two switches 304, 306 which form a switch matrix 308. The switch 304 is connected to a first input connection of the DC voltage converter 106 and connects the first input connection of the DC voltage converter 106 selectively to a first input connection of the DC voltage converter 302 or to the DC voltage post input connection 104.

The switch 306 is connected to the first input connection of the DC voltage converter 302 and connects the first input connection of the DC voltage converter 302 selectively to the first input connection of the DC voltage converter 106 or to DC voltage post input connection 102.

The switches 304 and 306 are actuated by the control unit 112 such that the DC voltage converters 106, 302 are connected either in parallel or in series.

A series connection of the DC voltage converters 106, 302 achieves an addition of the output DC voltages of the DC voltage converters 106, 302. A parallel connection of the DC voltage converters 106, 302 achieves an increase in an output DC current of the DC voltage converters 106, 302. An output DC current increase at the same output DC voltage $V_A$ effects an increase in the output power of the DC voltage converters 106, 302. Thus, the DC voltage charging post 300 can provide different charging voltages and charging powers. For example, when charging a lithium ion battery, charging is carried out initially with maximum charging power and the charging power is reduced in the further charging course.

All switches 202 to 210 and 304, 306 can be designed as a relay, a contactor or semiconductor switch, e.g. FET or bipolar transistor.

The invention claimed is:

1. A central unit, which comprises and controls a plurality of DC voltage charging posts for charging electric vehicles, wherein the plurality of DC voltage charging posts comprise in each case:
   two DC voltage charging post input connections for an input DC voltage (VE) with a first voltage range provided by the central unit;
   a first DC voltage converter for converting the input DC voltage (VE) into an output DC voltage (VA) with a second voltage range;
   two DC voltage charging post output connections for providing the output DC voltage (VA) to the electric vehicles;
   a control unit with a first communication interface for communication between the plurality of DC voltage charging posts and the central unit; and
   a second DC voltage converter, which is connected selectively in parallel or in series to the first DC voltage converter, wherein a series connection achieves an addition of the output DC voltage and a parallel connection achieves an increase in an output DC current of the first DC voltage converter and the second DC voltage converter.

2. The central unit according to claim 1, wherein the control unit transmits or receives via the first communication interface at least one of the following items of information:
   status of the plurality of DC voltage charging posts,
   data regarding the maximum power outputted from the plurality of DC voltage charging posts,
   charging energy value,
   charging time value,
   electric vehicle identification information, and
   software update data.

3. The central unit according to claim 1, wherein the control unit supports a serial communication standard, in particular ethernet, at the first communication interface.

4. The central unit according to claim 1, wherein the control unit includes a second communication interface for communication between the plurality of DC voltage charging posts and the electric vehicle.

5. The central unit according to claim 4, wherein the control unit supports at the second communication interface at least two different communication protocols at one charging point.

6. The central unit according to claim 5, having a third DC voltage converter and a fourth DC voltage converter, wherein all DC voltage converters are selectively connected in parallel or in series.

7. The central unit according to claim 1, having a switch matrix which is connected with the control unit, with at least one input connection of each DC voltage converter and with the DC voltage charging post input connections, wherein the control unit controls the switch matrix such that all DC voltage converters are connected either in parallel or in series.

8. The central unit according to claim 1, having an isolation measuring unit which is connected to the DC voltage charging post input connections and to earth, wherein the isolation measuring unit measures isolation of the DC voltage charging post to earth and, depending on the measurement, disconnects the plurality of DC voltage charging posts electrically from the electric vehicle.

9. The central unit according to claim 1, having a power measuring unit which is connected to the DC voltage charging post input connections and which determines the power outputted to the electric vehicle and/or the charging time.

10. The central unit according to claim 1, having a temperature measuring unit which is configured to control the power output of the plurality of DC voltage charging posts depending on the measured temperature.

11. The central unit according to claim 1, having at least one main switch, which is connected in series between the first DC voltage converter and one of the DC voltage charging post input connections, wherein the main switch is configured to connect the first DC voltage converter selectively with one of the DC voltage charging post input connections, or to disconnect it therefrom.

12. The central unit according to claim 11, wherein the at least one main switch is controlled depending on an emergency off-signal, a system error signal, and isolation of the plurality of DC voltage charging posts to earth.

* * * * *